United States Patent [19]

Kawamura et al.

[11] Patent Number: 4,798,257
[45] Date of Patent: Jan. 17, 1989

[54] ENERGY RECOVERY APPARATUS FOR TURBO COMPOUND ENGINE

[75] Inventors: Hideo Kawamura, Samukawa; Katsuyuki Tamai, Yokohama, both of Japan

[73] Assignee: Isuzu Motors Limited, Tokyo, Japan

[21] Appl. No.: 920,133

[22] Filed: Oct. 17, 1986

[30] Foreign Application Priority Data

Oct. 19, 1985 [JP] Japan ................. 60-233937
Oct. 19, 1985 [JP] Japan ................. 60-233939

[51] Int. Cl.⁴ .............................. B60K 13/00
[52] U.S. Cl. ........................ 180/165; 60/608
[58] Field of Search .......... 180/65.2, 65.3, 2.1, 180/165, 65.4; 60/597, 608

[56] References Cited

U.S. PATENT DOCUMENTS 3,923,115 12/1975 Helling ................. 180/165

FOREIGN PATENT DOCUMENTS 0141634 5/1985 European Pat. Off. .
0178270 4/1986 European Pat. Off. .
197483 4/1937 Fed. Rep. of Germany .
192652 8/1937 Fed. Rep. of Germany .
962764 4/1957 Fed. Rep. of Germany .
1040839 10/1958 Fed. Rep. of Germany .

OTHER PUBLICATIONS

Patent Abstracts of Japan, vol. 8, No. 270, (M-344)(1707), Dec. 11, 1984 & JP-A-59 141713 (Isuzu Jidosha K.K.), 14-08-1984.

Primary Examiner—David M. Mitchell
Assistant Examiner—Richard Camby
Attorney, Agent, or Firm—Staas & Halsey

[57] ABSTRACT

An energy recovery apparatus for a turbo compound engine is provided having an exhaust turbine with a first rotary machine in an exhaust pipe of an internal combustion engine; a second rotary machine mounted on a wheel axle of a motor vehicle which is driven by the internal combustion engine, and an exhaust turbine coupled to the exhaust port of the first-mentioned exhaust turbine; and a third rotary machine operable as a generator. The energy recovery apparatus also includes a first sensor for detecting the speed of rotation of the internal combustion engine and a second sensor for detecting the load on the engine. The first through third rotary machines are controlled by signals from the sensors and efficiently utilize the exhaust energy carried by the exhaust gas discharged from the internal combustion engine.

6 Claims, 5 Drawing Sheets

ENERGY RECOVERY APPARATUS FOR TURBO COMPOUND ENGINE

BACKGROUND OF THE INVENTION

The present invention relates to an energy recovery apparatus for a turbocharged compound engine capable of recovering the exhaust energy of an internal combustion engine and, more particularly, to an energy recovery apparatus for a turbo compound engine for recovering the exhaust energy by controlling an AC machine driven by the exhaust energy and an AC machine mounted on a wheel axle.

There have been developed, in recent years, thermally insulated engines having various components made of ceramics, including an outer wall of an exhaust manifold, a cylinder liner, an insulating plate for a cylinder head, and a piston, for example. In such thermally insulated engines, it is not necessary to cool the engine by radiating the heat generated inside the engine, but the energy from a high-temperature exhaust gas, discharged by the engine, is recovered and fed back to the output shaft of the engine, for increasing the output power from the engine.

One known method of recovering the exhaust energy of an engine utilizes a multistage gear speed reducer mechanism for reducing the speed of rotation of a turbine which is driven by the exhaust gas, and using this recovered energy to rotate the crankshaft, thereby increasing its output power.

Japanese Laid-Open Patent Publication No. 59 (1984)-141713 discloses an exhaust energy recovering device. According to the disclosed device, the exhaust turbine of an AC generator is rotated by the energy of an exhaust gas discharged from an internal combustion engine. An induction motor is operatively coupled to the output shaft of the engine and is driven by the output of the AC generator thereby recovering the exhaust energy. The device also includes means for determining the magnitude of a load on the engine in order to control the amount of intake air, so that the temperature of the exhaust gas can be increased when the engine load is small.

In the former method of recovering the exhaust energy, the transmission efficiency of the gear mechanism is low and the gear mechanism is complex, which results in an increased cost.

According to the latter exhaust energy recovering device, the electric power generated by the AC generator is utilized to rotate an induction motor, thus driving the output shaft of the engine. There is no gear mechanism required and the amount of intake air is controlletd by the engine load for recovering the exhaust energy more efficiently. However, it is desired to control the amount of generated power according to the engine load, and to charge the battery with the generated power.

SUMMARY OF THE INVENTION

It is an object of the present invention to provide an energy recovery apparatus for a turbo compound engine which does not employ a gear mechanism and which includes a first rotary machine operable as a generator for converting exhaust energy to electric energy to recover the same, and a second rotary machine mounted on a wheel axle and operable as a motor, driven by the recovered electric power, according to the speed of rotation and load on an internal combustion engine, thereby recovering the exhaust energy.

Another object of the present invention is to provide an energy recovery apparatus of the type described above which also includes a third rotary machine mounted on an exhaust turbine coupled to the exhaust port of a turbocharger and operable as a generator, in addition to the first rotary machine acting as a generator in the turbocharger, for converting the exhaust energy to electric energy and recovering same.

Still another object of the present invention is to provide an energy recovery apparatus of the type described above where when the internal combustion engine is in an idling mode, a battery is charged by the electric power generated by the first rotary machine acting as a generator.

A still further object of the present invention is to provide an energy recovery apparatus of the type described above in which the second rotary machine is operated as 9 motor driven by the electric power generated by the first rotary machine.

A yet still further object of the present invention is to provide an energy recovery apparatus of the type described above where, when the internal combustion engine operates in a low speed range and under a high load, a first rotary machine is operated as the motor using the electric power from a battery for increasing the boost pressure, and the second rotary machine is operated as a motor using the electric power generated by the third rotary machine as the generator.

A yet still further object of the present invention is to provide an energy recovery apparatus of the type described above where, when the engine is braked, a battery is charged by the third rotary machine as the generator.

Another object of the present invention is to provide an energy recovery apparatus of the type described above which includes a converter used to change the output of an AC generator from a higher frequency to a lower frequency.

Still another object of the present invention is to provide an energy recovery apparatus of the type described above which includes a rectifier and an inverter for converting the output of a higher frequency from an AC generator to an output of a lower frequency.

According to the present invention, there is provided an energy recovery apparatus in a turbo compound engine having; a first rotary machine disposed in a thermally insulated exhaust pipe of an internal combustion engine, including a thermally insulated combustion chamber; means for detecting the speed of rotation of the internal combustion engine; means for detecting the load on the internal combustion engine; a second rotary machine mounted on a wheel axle drivable by the engine; and means for controlling the operation of the first and second rotary machines according to the speed of rotation and the load on the internal combustion engine.

According to the present invention, there is also provided an energy recovery apparatus in a turbo compound engine including an exhaust turbine, having a generator disposed in a thermally insulated exhaust pipe of a internal combustion engine including a thermally insulated combustion chamber. The energy recovery apparatus includes means for detecting the speed of rotation of a wheel axle drivable by the internal combustion engine, an AC motor mounted on the wheel axle, and means for supplying electric power to the AC motor according to the speed of rotation of the wheel axle.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
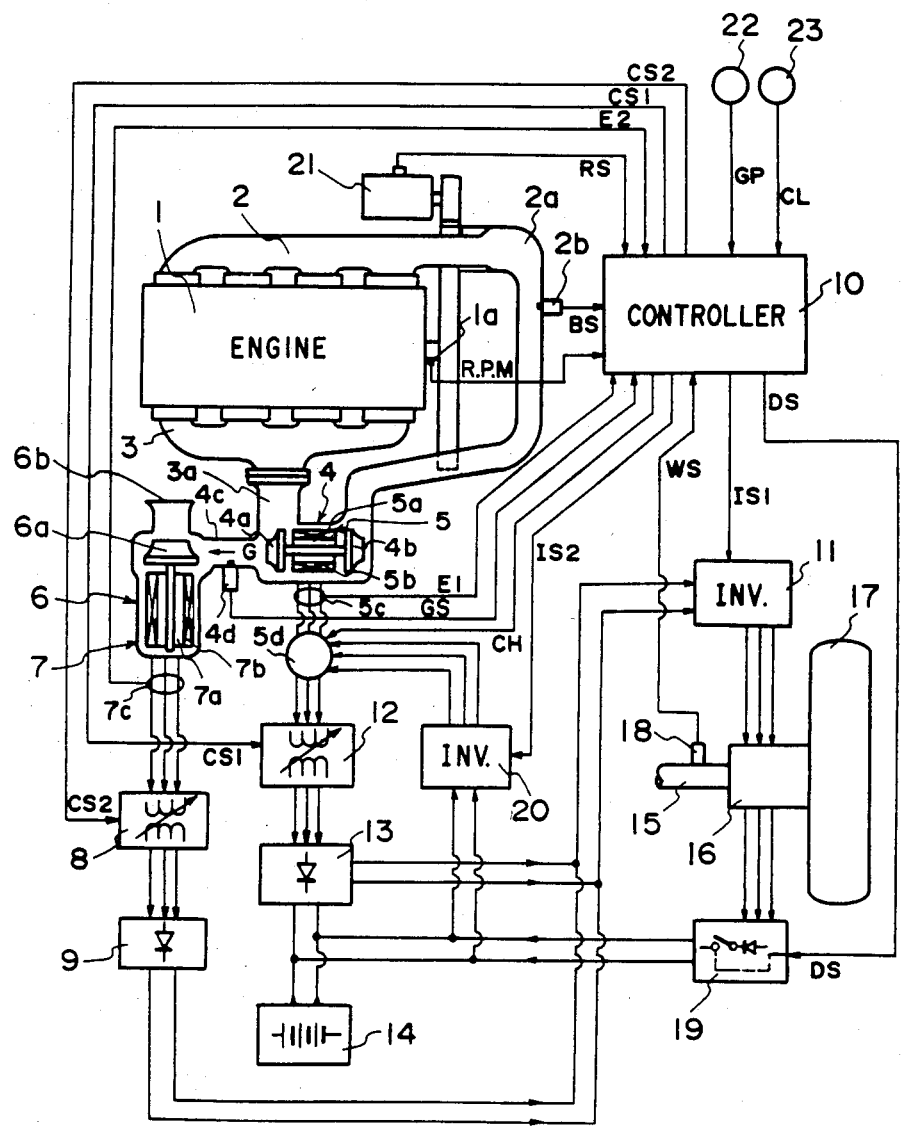
FIG. 1 is a schematic view of an energy recovery apparatus for a turbo compound engine according to an first embodiment of the present invention.

As shown in FIG. 1, an internal combustion engine 1 has combustion chambers, an exhaust pipe and other components which are of a thermally insulated structure. An intake pipe 2a is connected to an intake manifold 2, and an exhaust pipe 3a is connected to an exhaust manifold 3.

A turbocharger 4 is driven by the exhaust gas discharged from the exhaust pipe 3a and includes a turbine blade wheel 4a and a compressor blade wheel 4b between which there is disposed a first rotary machine 5 operable as a generator or a motor. A rotor 5a composed of a permanent magnet, having strong residual magnetism is disposed coaxially with the turbine blade wheel 4a. When the turbine blade wheel 4a is driven by the energy of the exhaust gas, the windings of a stator 5b positioned in confronting relation of the rotor 5a induce AC electric power which is transmitted from the first rotary machine 5 operating as a generator, to a switching device 5d. As the turbine blade wheel 4a is driven, the compressor blade wheel 4b charges air through the intake pipe 2a and the intake manifold 2 into the internal combustion engine 1. The boost pressure of the supercharged air is detected by a boost sensor 2b on the intake pipe 2a, and a detected signal BS from the boost sensor 2b is supplied to a controller 10.

The exhaust gas G with residual energy, which has driven the turbine blade wheel 4a, is introduced through an exhaust port 4c into an exhaust turbine 6, in which the exhaust gas drives a turbine blade wheel 6a. The exhaust gas, from which almost all exhaust energy has been removed, is discharged from an exhaust port 6b. The pressure of the exhaust gas G is detected by a pressure sensor 4d mounted on the exhaust port 4c, and a detected signal GS from the pressure sensor 4d is supplied to the controller 10.

A third rotary machine 7, operable as a generator, has its rotatable shaft disposed coaxially with the turbine blade wheel 6a. A rotor 7a composed of a permanent magnet having strong residual magnetism, is disposed on the shaft of the third rotary machine 7. When the rotor 7a is caused to rotate, the windings of a stator 7b, confronting the rotor 7a, induce AC electric power which is transmitted to a transformer 8. The voltage of the electric power generated by the third rotary machine 7 is detected by a voltage detector 7c, and a detected voltage E2 from the voltage detector 7c is applied to the controller 10. The output voltage from the first rotary machine 5, which is operated as the generator, is detected by a voltage detector 5c, and the detected AC voltage E1 from the voltage detector 5c is applied to the controller 10.

The transformer 8 converts the voltage of the AC electric power generated by the third rotary machine 7 to a prescribed voltage based on a control signal CS2 from the controller 10. The AC electric power from the transformer 8 is fed to a rectifier 9, which produces DC electric power that is supplied to an inverter 11.

The AC electric power, generated by the first rotary machine 5 operating as a generator and applied to the switching device 5d, is supplied to a transformer 12 as prescribed by control signal CH from the controller 10. The transformer 12 converts the applied voltage to a prescribed voltage based on a control signal CS1 from the controller 10, and the electric power from the transformer 12 is fed to a rectifier 13 which applies the DC output to a battery 14 and the inverter 11. The supplied DC electric power is converted by the inverter 11 to AC electric power having a frequency corresponding to a control signal IS1 from the controller 10. The AC electric power from the inverter 11 is supplied to a second rotary machine 16 disposed coaxially with a wheel axle 15 and operable as a motor or a generator to drive the axle 15, thereby rotating a wheel 17. The speed of rotation of the wheel axle 15 is detected by a rotation sensor 18, and a detected signal WS from the rotation sensor 18 is applied to the controller 10.

A rectifier 19 can be turned on or off by a signal DS from the controller 10. In response to the signal DS, the rectifier 19 converts the AC electric power, generated by the second rotary machine 16, to DC electric power which is supplied to charge the battery 14.

An inverter 20 is responsive to a control signal IS2 from the controller 10 thereby converting the DC power from the battery 14 to AC power of a prescribed frequency. The AC power from the inverter 20 is fed through the switching device 5d to the first rotary machine 5, so that the first rotary machine 5 will be operated as a motor for increasing the boost pressure if the boost pressure of the air charged into the internal combustion engine 1 is low.

The load on the internal combustion engine 1 is detected by a load sensor 21 which detects a rack position of the internal combustion engine 1. The gear position of a gear transmission is detected by a gear sensor 22. The clutch position is detected by a clutch sensor 23. These sensors 21, 22, 23 applied detected signals RS, GP, CL, respectively, to the controller 10. The speed of rotation of the internal combusion engine 1 is detected by a rotation sensor 1a, which supplies a rotation signal r.p.m. to the controller 10.

Figure 2:
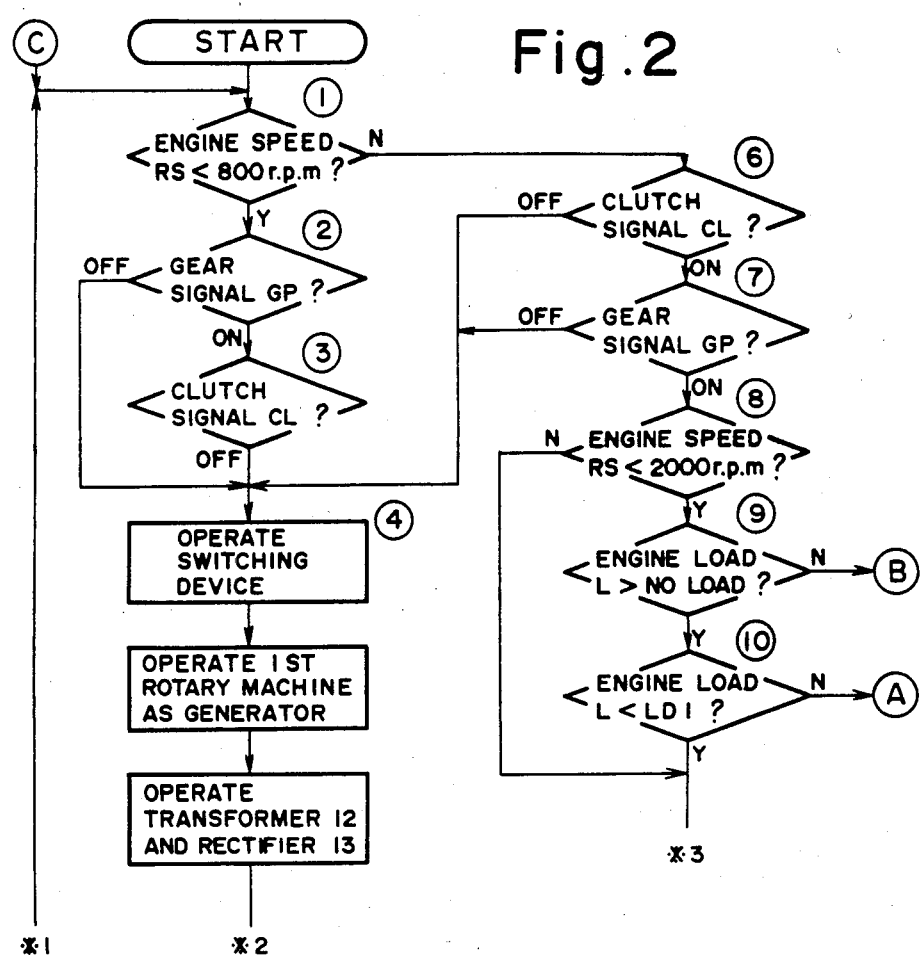
FIGS. 2, 2a, 2b and 2c represent a flowchart showing an operation sequence of the energy recovery apparatus of FIG. 1.
Figure 2A:
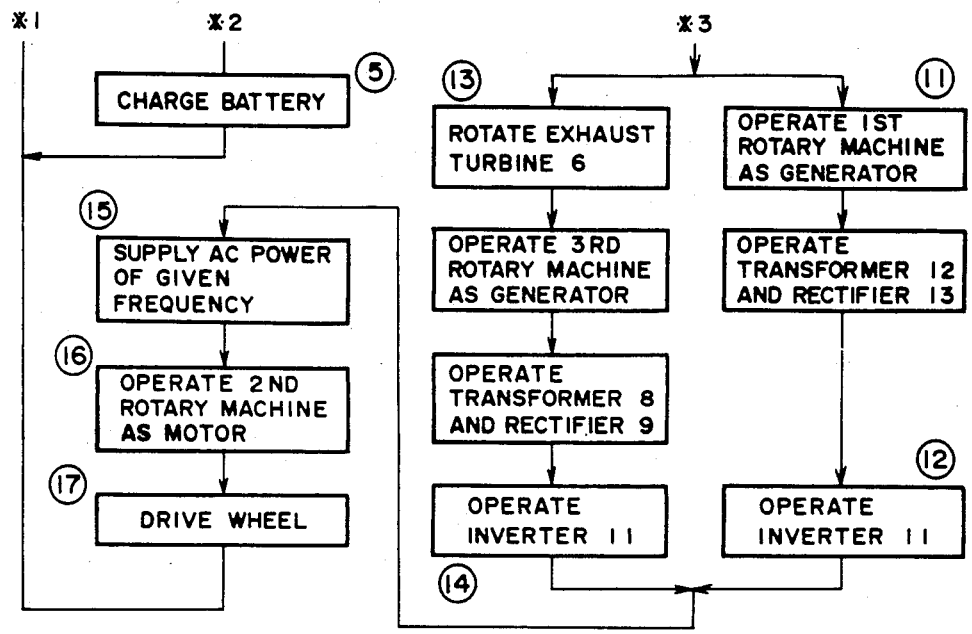
Figure 2B:
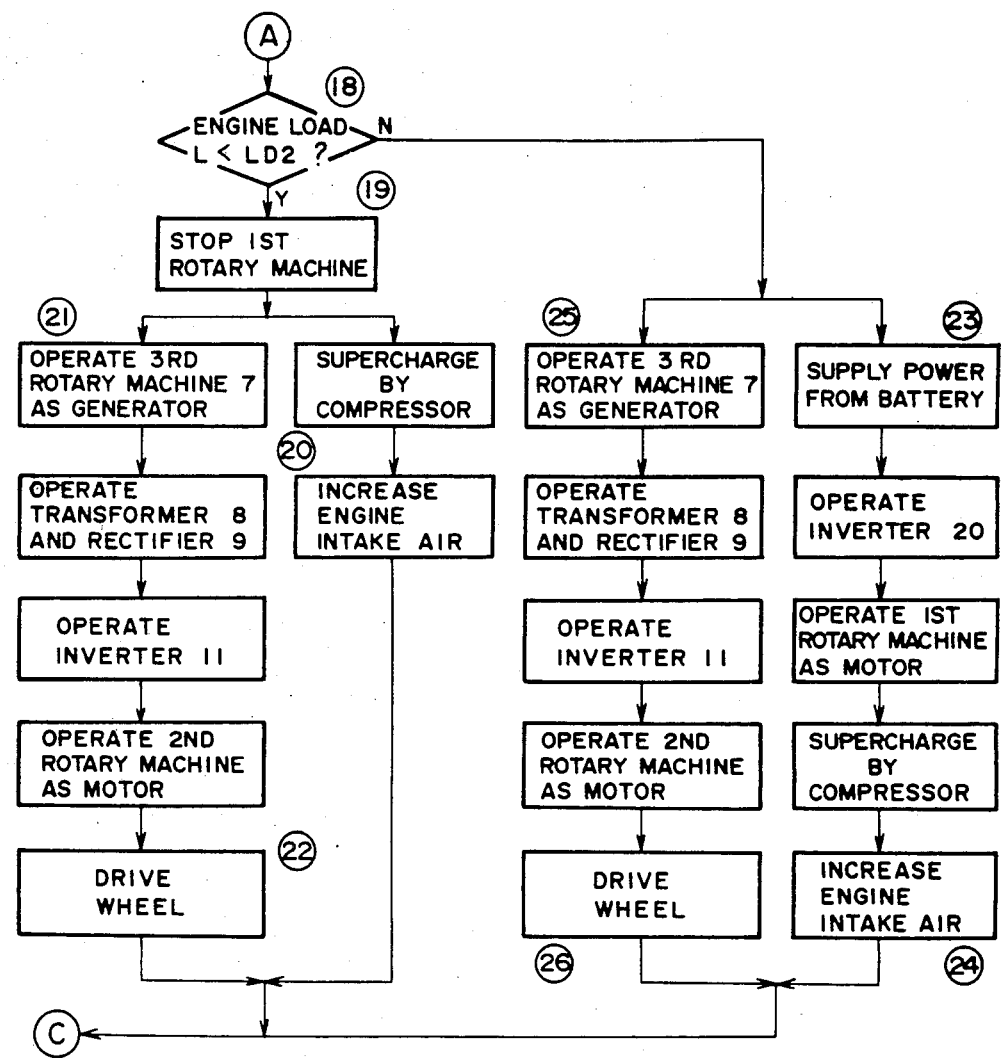
Figure 2C:
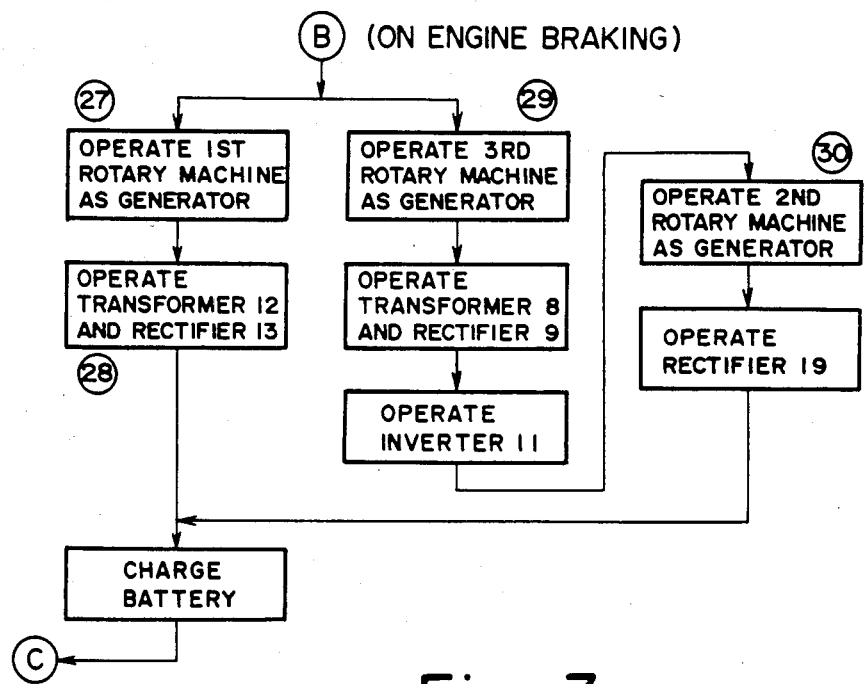
Figure 3:
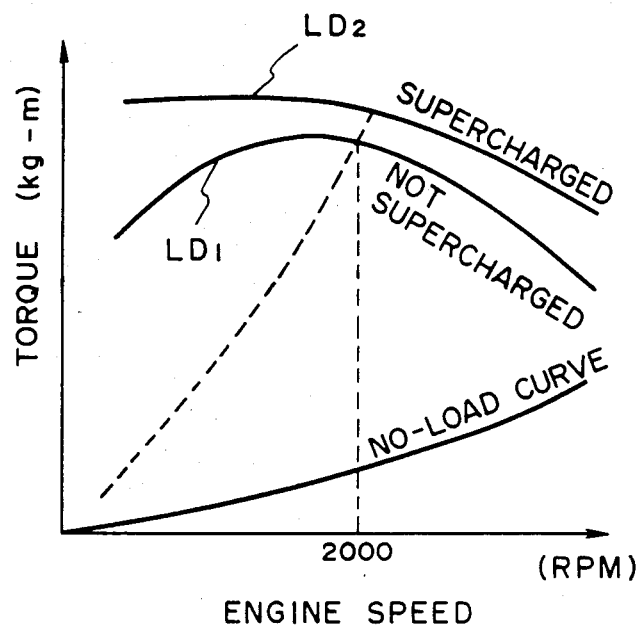
FIG. 3 is a graph showing the relationship between the torque and the speed of rotation of an internal combustion engine.

An operation sequence of the energy recovery apparatus shown in FIG. 1 will be described below with reference to FIGS. 2 and 3.

If the engine speed detected by the rotation sensor 1a is below 800 r.p.m. in step 1 in FIG. 2, the idling condition of the internal combustion engine 1 is detected by the controller 10 from the gear signal GP from the gear sensor 22 and the clutch signal CL from the clutch sensor 23 (steps 2 and 3). The controller 10 then switches the switching device 5d with the control signal CH to operate the first rotary machine 5 as a generator and convert the generated AC power to DC power through the transformer 12 and the rectifier 13 for charging the battery 14 (steps 4 and 5).

If the engine rotation speed is higher than 800 r.p.m. in the step 1, and the clutch signal CL is off indicating a clutch disconnection, or the gear signal GL is off indicating a neutral gear position, then control goes to the steps 4 and 5 to charge the battery 14.

If the gear signal GP is on indicating any other gear position than the neutral gear position in a step 7, then the controller 10 further checks the rotation of the internal combustion engine 1 with the rotation signal r.p.m. to determine whether the engine speed is lower than 2000 r.p.m. in step 8. If the engine speed is lower than 2000 r.p.m., and the engine load L is not nil, but is a light load smaller than LD1 (see FIG. 3) in steps 8, 9, and 10, then the operation sequence proceeds to step 11. The electric power generated by the first rotary machine 5 is supplied through the rectifier 13 to the inverter 11 (steps 11 and 12).

The exhaust turbine 6 is rotated by the exhaust gas G which has driven the turbine blade wheel 4a, to operate a third rotary machine 7 as the generator, and the generated power is supplied to the transformer 8 which is controlled by the control signal CS2 to regulate the voltage to a prescribed level. The electric power from the transformer 8 is converted by the rectifier 9 to DC power that is applied to the inverter 11 (steps 13 and 14). The pressure of the exhaust gas G is detected by the pressure sensor 4d, and based on the pressure signal GS and the voltage signal E2, the controller 10 applies the control signal CS to the transformer 8 so that the energy of the exhaust gas will be converted at electric energy to a predetermined level.

The electric power fed to the inverter 11 in steps 12 and 14 is controlled by the control signal IS1 applied to the inverter 11 upon application of the rotation signal WS from the rotation sensor 18 to the controller 10, such that the electric power is so as to be converted to AC power of a certain frequency and is supplied to the second rotary machine 16 operating as a motor (steps 15 and 16). The second rotary machine 16 now operates in a power running mode to assist in the rotation of the wheel 17 (step 17).

If the engine load L is between LD1 and LD2 (FIG. 3) in the step 10, then control goes to step 18 and step 19 in which the power generated by the first rotary machine 5 is cut off by the switching device 5d, and the exhaust energy is primarily utilized for rotating the compressor blade wheel 4b in order to increase the boost pressure and supply the same into the internal combustion engine 1 (steps 19 and 20). The power generated by the third rotary machine 7 as a generator is fed via the transformer 8 and the rectifier 9 to the inverter 11 for operating the second rotary machine 16 as a motor to assist in the rotation of the wheel shaft 15 (steps 21 and 22).

If the engine load L is larger than LD2 in the step 18, then the switching device 5d is controlled by the control signal CH to switch the first rotary machine 5 into the motor mode, and the DC power from the battery 14 is supplied to the inverter 20 and converted by the control signal IS2 to AC power of a prescribed frequency, which is supplied through the switching device 5d to drive the first rotary machine 5 acting as a motor. The boost pressure is controlled so that the pressure detected by the boost sensor 2b on the intake pipe 2a will become a prescribed pressure (steps 23 and 24). The AC power generated by the third rotary machine 7 based on the energy of the exhaust gas G is supplied through the transformer 8, the rectifier 9, and the inverter 11 to the second rotary machine 16 operating as a motor to assist in the rotation of the wheel axle 15 (steps 25 and 26).

If the engine load L is nil and the engine braking is detected from the load signal RS, the clutch signal CL, and the gear signal GP in step 9, then control goes to step 27. The switching device 5d is controlled by the control signal CH, from the controller 10, to supply the power generated by the first rotary machine 5 operating as a generator, to the transformer 12 which supplies the power through the rectifier 13 to charge the battery 14 (steps 27 and 28). The electric power generated by the third rotary machine 7 is also fed through the transformer 8 and the rectifier 9 to the inverter 11, from which it is supplied to the windings of the second rotary machine 16 (steps 29 and 30). In response to the control signal DS from the controller 10, the rectifier 19 converts, together with the power from the step 28, a power generated by the second rotary machine 16, driven as a generator under the inertial force of the wheel 17, to DC power which is supplied to charge the battery 14 (steps 29 through 30).

Figures 4, 5:
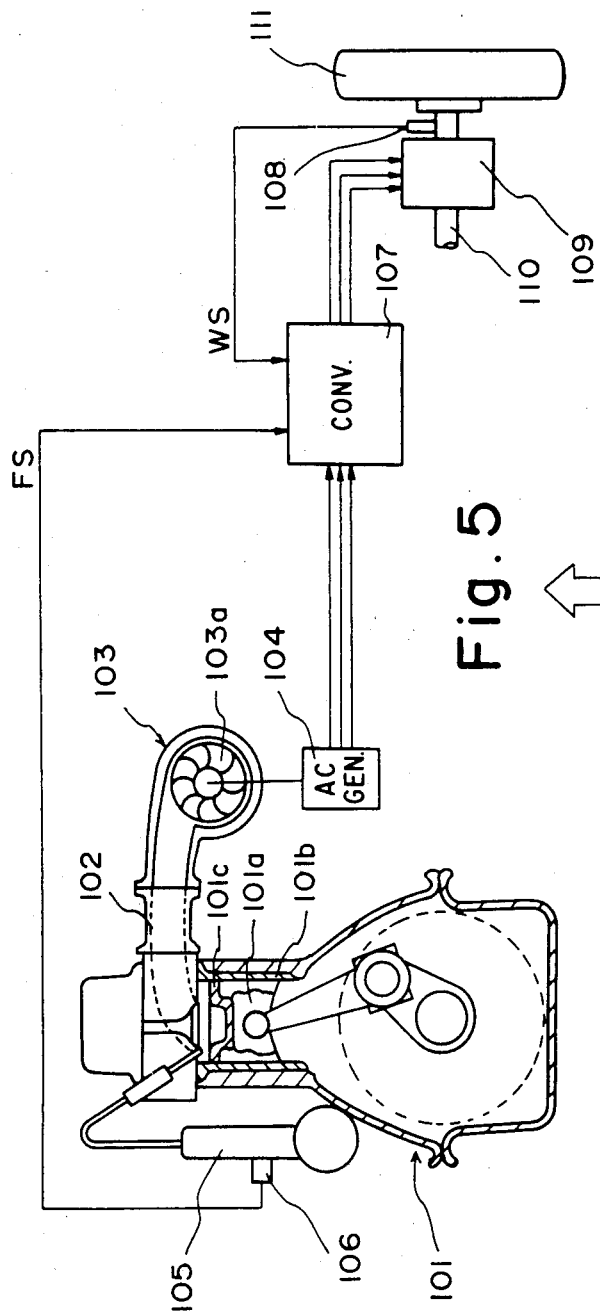
FIG. 4 is a schematic view of an exhaust energy recovery apparatus according to a second embodiment of the present invention.
FIG. 5 is a block diagram showing a third embodiment of the present invention which is a modification of the second embodiment.

An energy recovery apparatus according to a second embodiment of the present invention is shown in FIG. 4.

An engine 101 includes a combustion chamber defined by a piston 101a, a cylinder liner 101b and an exhaust port 101c, the combustion chamber and the exhaust port 101c being constructed of a thermally insulated ceramic material. An exhaust turbine 103, having an AC generator 104, is mounted on an exhaust manifold 102 coupled to the exhaust port 101c.

The exhaust turbine 103 has a rotatable shaft coupled directly to the rotatable shaft of an AC generator 104. When a turbine blade wheel 103a of the exhaust turbine 103 is rotated by the high-temperature exhaust gas discharged from the exhaust manifold 102, the AC generator 104 generates AC electric power of a high frequency. Fuel is injected by a fuel injection pump 105 into the engine 101. A load sensor 106 is mounted on the fuel injection pump 105 for detecting the amount of fuel injected to generate a load signal FS. A converter 107 in the form of a cycloconverter, for example, efficiently converts the high frequency AC power from the AC generator 104 to AC power of a lower frequency. The frequency conversion effected by the converter 107 is controlled by a rotation signal WS from a rotation sensor 108, which detects the speed of rotation of a wheel axle 110 supporting a wheel 111 and the load signal FS from the load sensor 106.

A motor 109 has a rotatable shaft disposed coaxially with the wheel axle 110. The motor 109 is supplied with AC power from the converter 107 to drive the wheel 111. The frequency of the AC power supplied from the converter 107 to the motor 109 is controlled by the rotation signal WS and the load signal FS at all times so that the motor 109 is driven in a power running mode. Therefore, the wheel 111 is always assisted in its rotation by the motor 109 operating in the power running mode.

FIG. 5 shows a third embodiment of the present invention which is a modification of the arrangement shown in FIG. 4.

Denoted in FIG. 5 at 112 is a rectifier and 113 an inverter. The power generated by the AC generator 104 (FIG. 4) is supplied to the rectifier 112, and DC power from the rectifier 112 is supplied to the inverter 113 which is controlled by the rotation signal WS from the rotation sensor 108 (FIG. 4) and the load signal FS from the load sensor 106 (FIG. 4). The DC power supplied to the inverter 113 is thereby converted to AC power of a prescribed frequency to energize the motor 109.

Operation of the second and third embodiments is as follows:

In the arrangement of FIG. 4, the high-temperature exhaust gas discharged from the engine 101 of a thermally insulated structure is introduced through the exhaust manifold 102 into the exhaust turbine 103 to drive the AC generator 104 coupled to the turbine blade wheel 103a. The AC power generated by the AC generator 104 is supplied to the converter 107.

The converter 107 is responsive to the load signal FS from the load sensor 106 and the rotation signal WS from the rotation sensor 108, and correspondingly converts the AC power of a higher frequency from the AC generator 104 to AC power of a lower frequency, which is supplied to energize the motor 109. Therefore, the motor 109 is energized in the power running mode to drive the wheel axle 110 and assist in the rotation of the wheel 111 irrespective of the speed of rotation of the wheel axle 110.

In FIG. 5, the exhaust energy is converted by the AC generator 104 to electric energy which is utilized to energize the motor 109 in the power running mode at a rate corresponding to the speed of rotation of the wheel axle 110 used for driving the wheel 111, as with the arrangement of FIG. 4. With the rectifier 112 and the inverter 113 added to the electric energy transmission path, however, the loss caused by these additional components makes the overall efficiency of exhaust energy recovery lower than that of the system of FIG. 4.

Although certain preferred embodiments have been shown and described, it should be understood that many changes and modifications may be made therein without departing from the scope of the appended claims.

What we claim is:

1. An energy recovery apparatus in a turbo compound engine having a turbocharger operable by exhaust gases emitted from an internal combustion engine mounted on a vehicle, said energy recovery apparatus comprising:
   (a) a first rotary machine disposed in said turbocharger;
   (b) a second rotary machine disposed on a wheel axle driven by said engine;
   (c) a third rotary machine disposed in an exhaust turbine disposed in an exhaust pipe of said internal combustion engine, and operable as a generator for converting exhaust energy from the internal combustion engine to electric energy for energy recovery;
   (d) means for detecting the speed of rotation of said engine;
   (e) means for detecting the load on said engine;
   (f) means for operating said first rotary machine as a generator while said engine is idling; and
   (g) means for charging a battery with electric power generated by said first rotary machine.

2. An energy recovery apparatus in a turbo compound engine having a turbocharger operable by exhaust gases emitted from an internal comustion engine mounted on a vehicle said energy recovery apparatus comprising:
   (a) a first rotary machine disposed in said turbocharger;
   (b) a second rotary machine disposed on a wheel axle driven by said engine;
   (c) a third rotary machine disposed in an exhaust turbine disposed in an exhaust pipe of said internal combustion engine, and operable as a generator for converting exhaust energy from the internal combustion engine to electric energy for energy recovery;
   (d) means for detecting the speed of rotation of said engine;
   (e) means for detecting the load on said engine;
   (f) means for operating said first rotary machine and said third rotary machine as generators when the speed of rotation of said engine is higher than a predetermined speed; and
   (g) means for operating said second rotary machine as a motor with electric power generated by said first rotary machine and said third rotary machine.

3. An energy recovery apparatus in a turbo compound engine having a turbocharger operable by exhaust gases emitted from an internal combustion engine mounted on a vehicle, said energy recovery apparatus comprising:
   (a) a first rotary machine disposed in said turbocharger;
   (b) a second rotary machine disposed on a wheel axle driven by said engine;
   (c) a third rotary machine disposed in an exhaust turbine disposed in an exhaust pipe of said internal combustion engine, and operable as a generator for converting exhaust energy from the internal combustion engine to electric energy for energy recovery;
   (d) means for detecting the speed of rotation of said engine;
   (e) means for detecting the load on said engine;
   (f) means for operating said first rotary machine and said third rotary machine as generators when the speed of rotation of said engine is lower than a predetermined speed ad the load on said engine is small; and
   (g) means for operating said second rotary machine as a motor with electric power generated by said first rotary machine and said third rotary machine.

4. An energy recovery apparatus in a turbo compound engine having a turbocharger operable by exhaust gases emitted from an internal combustion engine mounted on a vehicle, said energy recovery apparatus comprising:
   (a) a first rotary machine disposed in said turbocharger;
   (b) a second rotary machine disposed on a wheel axle driven by said engine;
   (c) a third rotary machine disposed in an exhaust turbine disposed on an exhaust pipe of said internal combustion engine, and operable as a generator for converting exhaust energy from the internal combustion engine to electric energy for energy recovery;
   (d) means for detecting the speed of rotation of said engine;
   (e) means for detecting the load on said engine;

(f) means for operating said first rotary machine as a motor with electric power from a battery and for operating said third rotary machine as a generator when the speed of rotation of said engine is lower than a predetermined speed and the load on said engine is large; and (g) means for operating said second rotary machine as a motor with electric power generated by said first rotary machine and said third rotary machine.

5. An energy recovery apparatus in a turbo compound engine having a turbocharger operable by exhaust gases emitted from an internal combustion engine mounted on a vehicle, said energy recovery apparatus comprising:

(a) a first rotary machine disposed in said turbocharger;

(b) a second rotary machine disposed on a wheel axle driven by said engine;

(c) a third rotary machine disposed in an exhaust turbine disposed in an exhaust pipe of said internal combustion engine, and operable as a generator for converting exhaust energy from the internal combustion engine to electric energy for energy recovery;

(d) means for detecting the speed of rotation of said engine;

(e) means for detecting the load on said engine;

(f) means for operating said third rotary machine as a generator when the speed of rotation of said engine is lower than a predetermined speed and the load on said engine is medium; and (g) means for operating said second rotary machine as a motor with electric power generated by said third rotary machine.

6. An energy recovery apparatus in a turbo compound engine having a turbocharger operable by exhaust gases emitted from an internal combustion engine mounted on a vehicle, said energy recovery apparatus comprising:

(a) a first rotary machine disposed in said turbocharger;

(b) a second rotary machine disposed on a wheel axle driven by said engine;

(c) a third rotary machine disposed in an exhaust turbine disposed in an exhaust pipe of said internal combustion engine, and operable as a generator for converting exhaust energy from the internal combustion engine to electric energy for energy recovery;

(d) means for detecting the speed of rotation of said engine;

(e) means for detecting the load on said engine;

(f) means for operating said first rotary machine, said second rotary machine, and said third rotary machine as generators when the speed of rotation of said engine is lower than a predetermined speed and the load on said engine is nil; and (g) means for charging a battery with electric power generated by said first rotary machine, said second rotary machine, and said third rotary machine.

* * * * *